(12) United States Patent
Carpenter et al.

(10) Patent No.: US 8,818,023 B2
(45) Date of Patent: Aug. 26, 2014

(54) BULK REGION OF INTEREST LEARNING

(75) Inventors: Michael D. Carpenter, Arlington, TX (US); Brent A. Raney, Purcellville, VA (US)

(73) Assignee: Siemens Industry, Inc., Alpharetta, GA (US)

( * ) Notice: Subject to any disclaimer, the term of this patent is extended or adjusted under 35 U.S.C. 154(b) by 627 days.

(21) Appl. No.: 13/071,897

(22) Filed: Mar. 25, 2011

(65) Prior Publication Data
US 2012/0243728 A1 Sep. 27, 2012

(51) Int. Cl.
*G06K 9/00* (2006.01)
(52) U.S. Cl.
USPC ............................................ 382/101; 382/181
(58) Field of Classification Search
CPC ............ B07C 3/00; B07C 3/008; B07C 3/10; B07C 3/14; B07C 3/20; B07C 1/00; B07C 2301/00; B07C 2501/00; G06K 9/3233; G06K 2209/01; G06K 9/00469; G06F 17/30253; G06F 17/30259; G06Q 10/08; G06T 1/0028
See application file for complete search history.

(56) References Cited

U.S. PATENT DOCUMENTS

| | | | | |
|---|---|---|---|---|
| 4,516,264 A * | 5/1985 | Corvari et al. | ................ | 382/101 |
| 4,845,761 A * | 7/1989 | Cate et al. | ..................... | 382/101 |
| 5,159,667 A * | 10/1992 | Borrey et al. | ................. | 715/205 |
| 5,581,628 A * | 12/1996 | Nakamura et al. | ............ | 382/101 |
| 6,360,001 B1 * | 3/2002 | Berger et al. | ................. | 382/101 |
| 6,683,967 B1 * | 1/2004 | Takahashi | ..................... | 382/101 |
| 6,728,391 B1 * | 4/2004 | Wu et al. | ........................ | 382/101 |
| 6,798,895 B1 * | 9/2004 | Takahashi | ..................... | 382/101 |
| 7,161,108 B2 * | 1/2007 | O'Connell et al. | ........... | 209/584 |
| 7,769,778 B2 * | 8/2010 | Snapp et al. | ................... | 707/780 |
| 7,917,544 B2 * | 3/2011 | Bellamy et al. | ............... | 707/802 |
| 7,925,046 B2 * | 4/2011 | Rundle et al. | ................. | 382/101 |
| 8,126,204 B2 * | 2/2012 | Desprez | ........................ | 382/101 |
| 8,295,540 B2 * | 10/2012 | Benyoub et al. | .............. | 382/101 |
| 2004/0223628 A1 * | 11/2004 | Call et al. | ....................... | 382/101 |
| 2006/0215878 A1 * | 9/2006 | Maeda et al. | ................. | 382/101 |
| 2006/0269101 A1 * | 11/2006 | Hansel et al. | ................. | 382/101 |
| 2010/0232642 A1 * | 9/2010 | Desprez | ........................ | 382/101 |
| 2012/0008824 A1 * | 1/2012 | Miette et al. | .................. | 382/101 |

\* cited by examiner

*Primary Examiner* — Manav Seth

(57) ABSTRACT

A system and method for mail processing. A method includes receiving an image of a mail piece, and identifying multiple regions of interest of the image. The method includes determining a classification key for the image based on a plurality of relationships between the multiple regions of interest and identifying a most-changing region of interest of the multiple regions of interest. The method includes processing the mail piece using the identified most-changing region of interest as the recipient address block.

20 Claims, 5 Drawing Sheets

BULK REGION OF INTEREST LEARNING

TECHNICAL FIELD

The present disclosure is directed, in general, to processing mail pieces.

BACKGROUND OF THE DISCLOSURE

Improved systems for processing mail pieces, and in particular bulk mail pieces, are desirable.

SUMMARY OF THE DISCLOSURE

Various disclosed embodiments include a system and method. A method includes receiving an image of a mail piece, and identifying multiple regions of interest of the image. The method includes determining a classification key for the image based on a plurality of relationships between the multiple regions of interest and identifying a most changing region of interest of the multiple regions of interest. The method includes processing the mail piece using the identified most-changing region of interest as the recipient address block.

Another embodiment includes a mail processing system having at least a processor, accessible memory, and an imager configured to create an image of a mail piece. The mail processing system is configured to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include systems and methods for automatically locating difficult-to-find addresses on mail items that are part of a bulk mailing.

In postal automation, Optical Character Recognition (OCR) is not always the most difficult recognition task that is performed, as automatic systems scan the mail to determine where it should be delivered. It is often the case that the characters that make up the address on a mail piece would be legible to the automatic systems, but they cannot be found.

Figure 1:
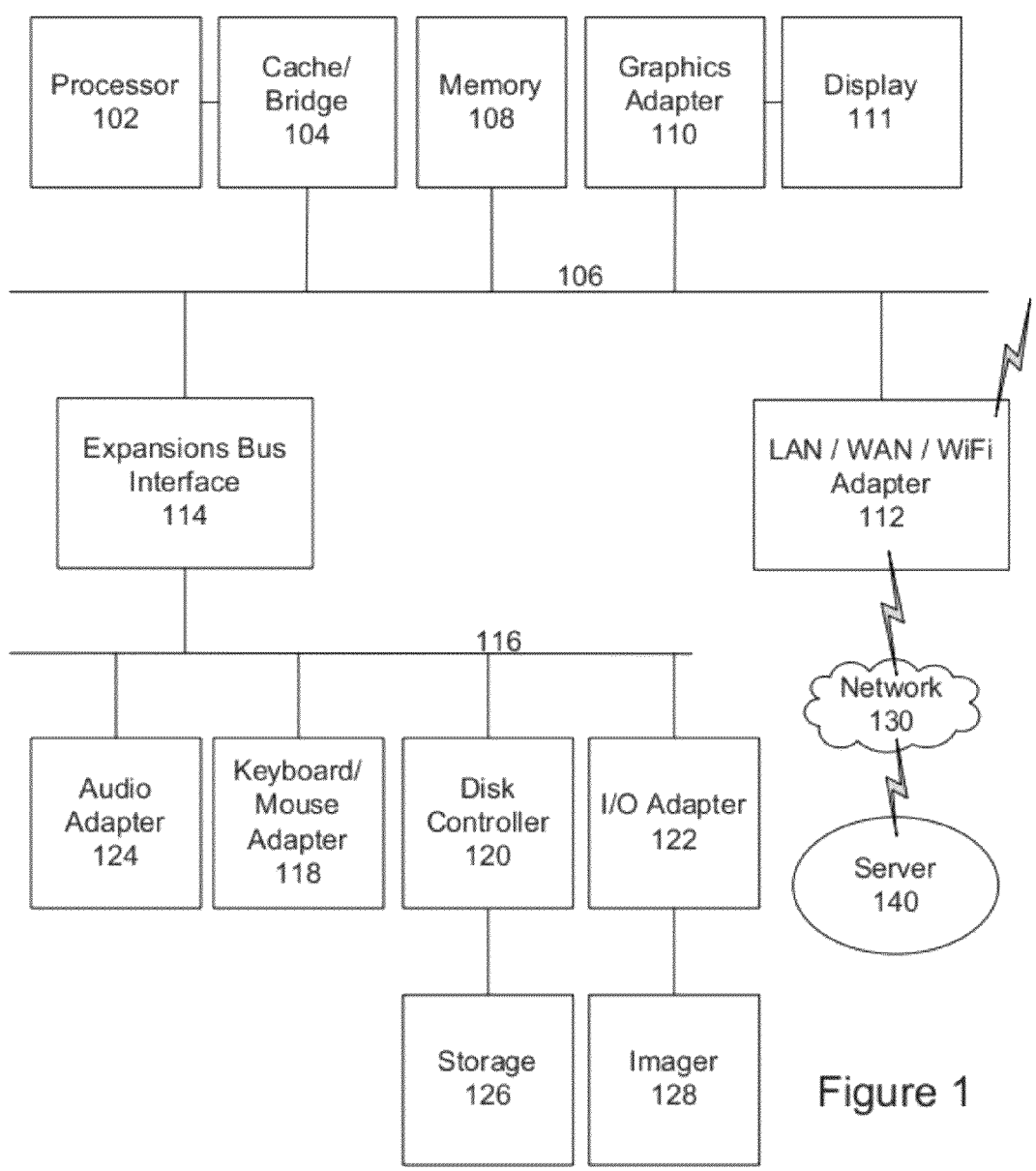
FIG. 1 depicts a block diagram of a data processing system in which an embodiment can be implemented, for example as one of the systems described below, and can be configured to perform processes as described herein.

FIG. 1 depicts a block diagram of a data processing system in which an embodiment can be implemented, for example as one of the systems or servers described below, and can be configured to perform processes as described herein. In particular embodiments, the data processing system below can be implemented as part of a mail processing or sorting machine. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. I/O adapter 122 can also be connected, in some embodiments, to an imager 128, which can be implemented as any scanning device, camera, or similar system capable of performing the scanning functions described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted, and other known elements of a mail processing system can be included to handle the mail as described herein or as known to those of skill in the art. The depicted example is provided for the purpose of explanation only and is not meant to imply architectural limitations with respect to the present disclosure.

A data processing system in accordance with an embodiment of the present disclosure includes an operating system that can employ a graphical user interface. The operating system can permit multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with test box controllers as described herein, and perform other data processing system or server processes described herein. Data processing system 100 can communicate over network 130 with one or more server systems 140, which are also not part of data processing system 100, but can be implemented, for example, as separate data processing systems 100.

In automated mail processing systems, finding the address is made more challenging in mail piece layouts that are designed to make an item being mailed look less like typical mail, and thereby increase the chances that the item's unusual appearance induces the recipient to examine the item more closely. Other problem layouts are caused by the appearance of many fields which look like an address, or by putting the intended recipient's address in a highly unconventional position. Practically all of these problems are associated with periodicals (magazines, etc.) or advertising mail, both of which tend to be processed in very large batches.

Algorithms designed to find the address bock in an image of an item that has been mailed are named collectively according to their purpose, including Address Block Location (ABL) and Region Of Interest (ROI) analyses. ROI algorithms can usually be adapted to solve the problem of an unusual or difficult layout. ROI has been constantly optimized according to sample images that are periodically collected, but the mail is continually changing, so that enhancements to ROI can never keep up with ROI problems.

Figure 2:
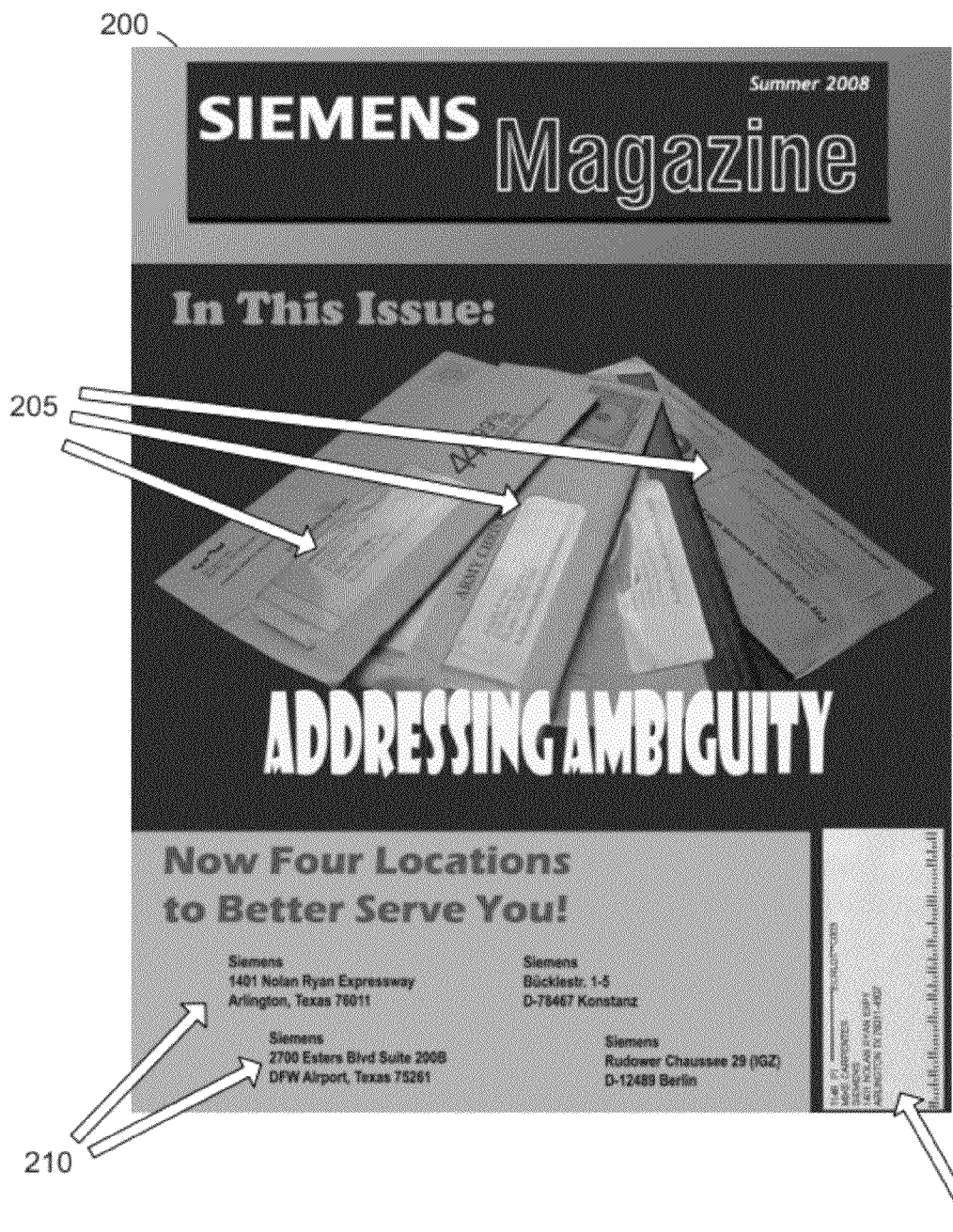
FIG. 2 illustrates an example of a problem mailpiece.

FIG. 2 illustrates an example of a problem mailpiece 200. The exemplary magazine mail piece depicted here shows several features that can make ROI detection difficult. One or more of these problematic features, and others not depicted here, can force such mailings into an exception process in conventional system.

For example, this mail piece depicts several irrelevant features 205 that resemble address blocks in that they include addresses, barcodes, and other similar addressing features in the depiction of letters. This mail piece also shows multiple addresses 210 that are not the intended recipient's mailing address and so can introduce ambiguity to conventional systems. This mail piece also shows the mailing label 215 with unconventional orientation and placement, which can make it even more difficult to automatically and correctly detect the address block on the mail piece.

In such an example, the mail piece is typically rejected, meaning it cannot be automatically coded. Each mail item that is rejected is displayed to a human operator, who takes over the task to identify the address. Since these mail items are typically processed in very large batches, the flow of rejected mail items to the human operators tends to occur in massive surges that are impossible to staff. The result is mail that cannot be automatically sorted.

Various embodiments include systems and methods that learn the ROI area for unusual layouts, and then use the learned ROI position to process mail pieces of that type. For bulk mailings in particular, several characteristics of the mail pieces, such as shown the example in FIG. 2, are exploited by the disclosed embodiments for more effective identification of the ROIs.

One characteristic of such mail pieces is that they tend to occur in batches. That is, typical single-letter mailings tend to conform to standard mail piece formats, while non-conforming mail pieces such as those addressed herein tend to be bulk mailings where a relatively large number of non-conforming mail pieces are mailed together.

Another characteristic is that such non-conforming mail pieces are essentially identical within the batch, with the exception of the recipient address label, which is unique on each mail piece. Other than the address label, the remaining graphics, text, or other items on the mail piece are generally consistent throughout the batch of mailpieces.

Another characteristic is that the basic graphic appearance of individual address blocks among a batch varies. For example, while the address label or address block will generally remain in the same location in a batch, the formatting of the address block such as line lengths and positioning will vary since the addresses they represent change on each mail piece.

Another characteristic is that recipient addresses tend to be applied in a process that induces variation in their placement among items in a batch. For example, when address labels are applied to a mail piece, there are typically variations in the adhesive label placement on the mail piece, while the other printed aspects of the mail piece remain in a fixed position relative to each other.

These characteristics make the recipient address identifiable by means of technologies used in a unique combination, as described herein.

There are various means of classifying bulk mailings; that is, determining that a mail item should be classified as a specific type of bulk mail. In one such method of classifying mail items of a bulk mailing, potential Regions Of Interests are identified within a binarized image with strong edge detection, and the relationships in the positions of the various regions to one another are measured. The relationships between different potential regions of interest represent a method for characterizing bulk mail types.

Some systems and methods that can be used for analysis and classification are described in U.S. Patents and Publications U.S. Pat. No. 7,362,892, 2008/0008378, and 2008/0008379, all of which are incorporated by reference.

Figure 3:
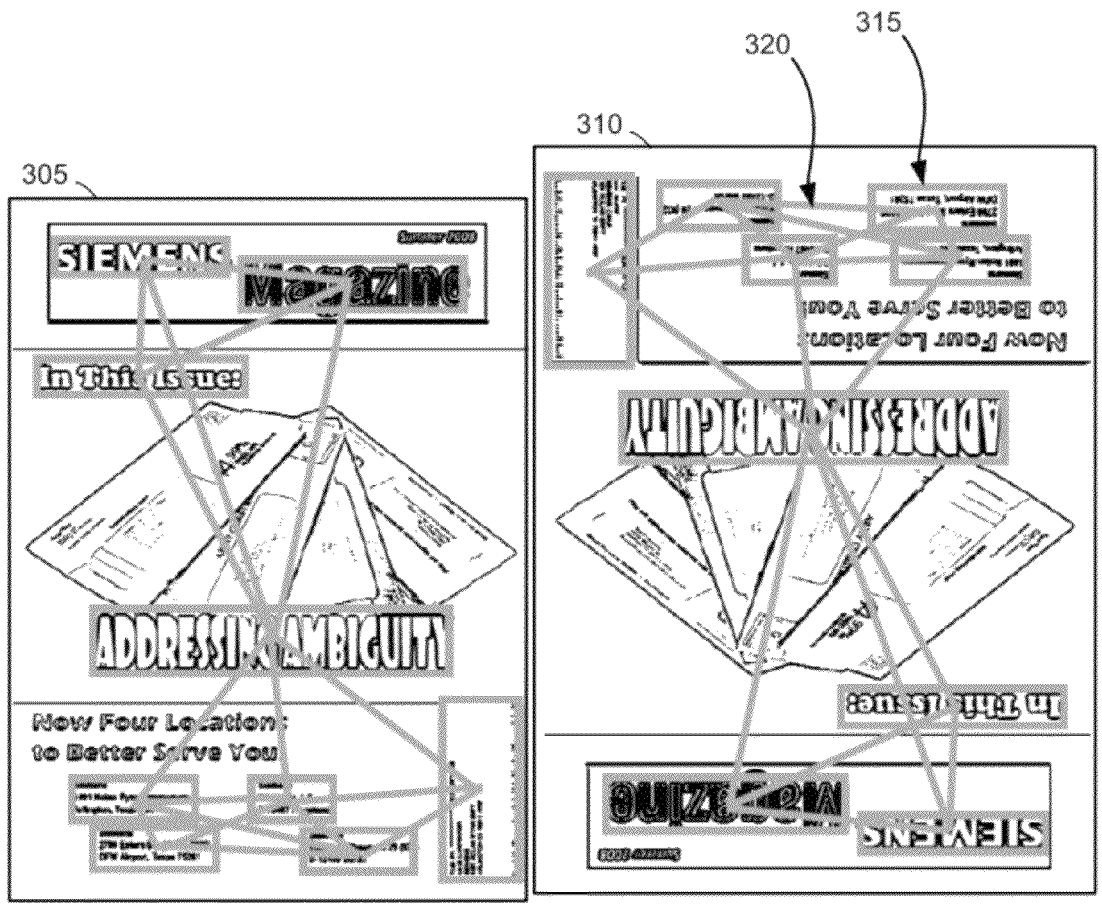
FIG. 3 shows how the positional relationships between potential regions of interest can create a key for classifying bulk mailings in accordance with disclosed embodiments.

FIG. 3 shows how the positional relationships between potential regions of interest can create a key for classifying bulk mailings, despite orientation. This figure shows two examples 305 and 310 of the same mail piece. The regions of interest, shown here in boxes 315, are identified by the system, and the relationships between the ROIs are mapped by the system, as illustrated by connecting lines 320. Such relationships can include the relative position and distance between the ROIs. The system recognizes the pattern of the relationships, and from these relationships can determine that mail pieces 305 and 310 are the same type of mail piece and that one is differently oriented with respect to the other. In some embodiments, this analysis can be performed using techniques such as those described in U.S. patent application Ser. No. 11/171,536, filed Jun. 30, 2005 and published as US 2006/0080266 A1, hereby incorporated by reference.

Another part of disclosed processes includes a comparison among images of a common type to determine which area is changing. That is, once two mail pieces are determined by the system to be the same type of mail piece, the images of two or more of them can be compared to determine which portion of the mail piece images is changing in each image.

According to various embodiments, at least two images are compared, feature for feature, to determine which features have different characteristics. As described herein, the portion of the images that is changing acts as an indication of the resident address area for that type of mail piece.

There are a numerous known methods for identifying a region that is changing in a sequence of images. Hausdorff-based image comparison will be described here, but any number of methods are available to one skilled in the art. Starting with the binary image used to classify a mail item as part of a batch, multiple images (typically sequential) of the same batch are compared to identify areas with significant change.

Figure 4:
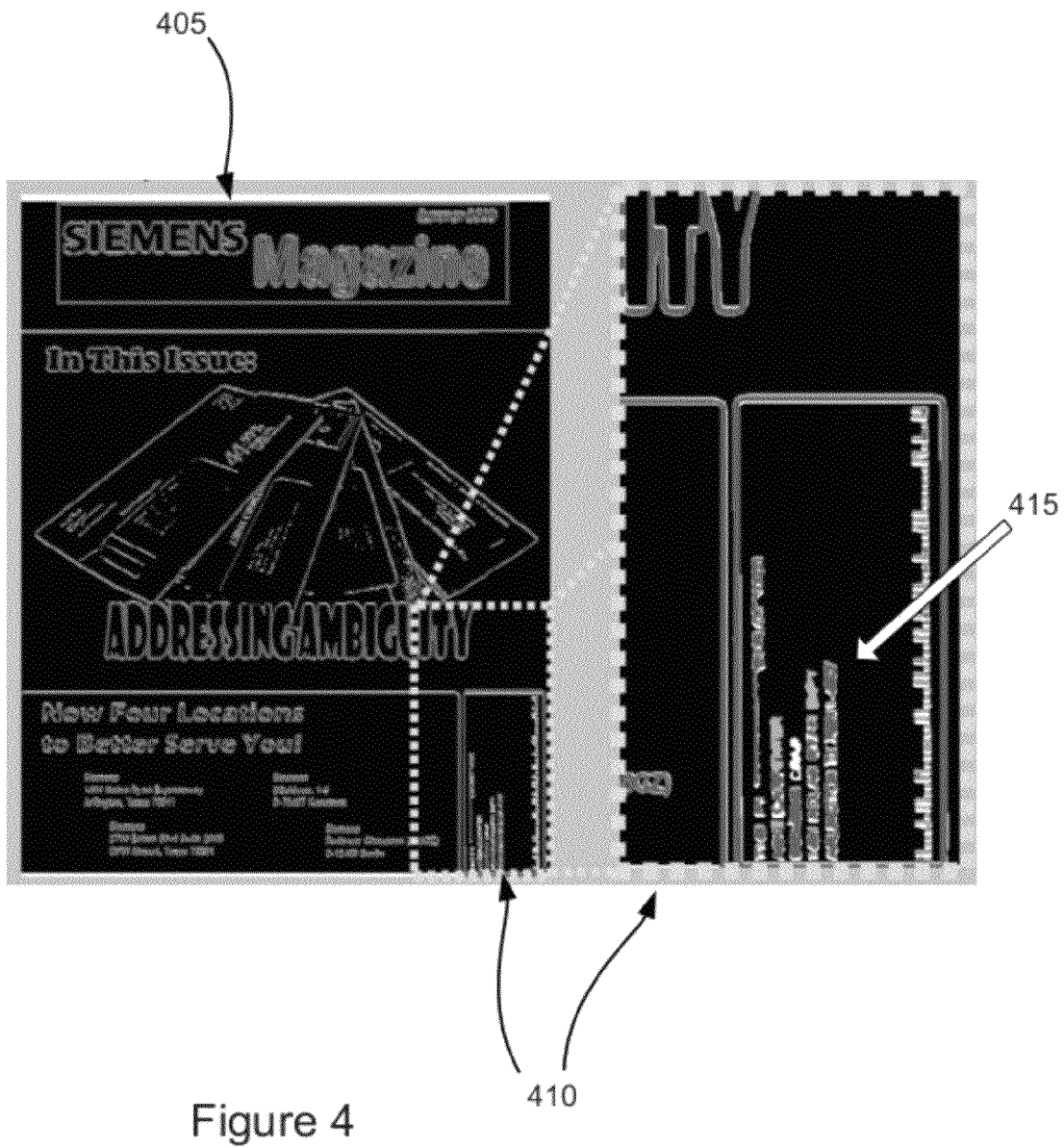
FIG. 4 shows two images of a type in an overlay, in accordance with disclosed embodiments.

FIG. 4 shows two images of a type in an overlay 405, with greater detail of the section 410 of the image in which there is significant change. In the detailed section 410, different colored pixels (not reproducible in these figures) can represent pixels found only in the first section, pixels found only in the second section, and pixels found in both sections. In this figure, the distorted characters and lines in the address block at 415 illustrate the changes in this section 410. In particular, characters that cannot be clearly overlaid and differences in the length of text lines are significant indicators of significant changes.

The region identified by the greatest number of non-common features, 415 in this example, represents the region that is most different between one mail item and another. As such, it is most likely to be the location of the unique address for each item. Information that can include the detected regions of interest, the most likely address block and region of interest that contains it, any information of the recipient or sender addresses, or other information can be stored as OCR pre-knowledge to aid an OCR process in efficiently determining and coding the recipient address without operator intervention.

In a system implementation, the processes could be implemented as a process for all bulk mail, as an exception process for rejects when dealing with bulk mail, or otherwise.

Figure 5:
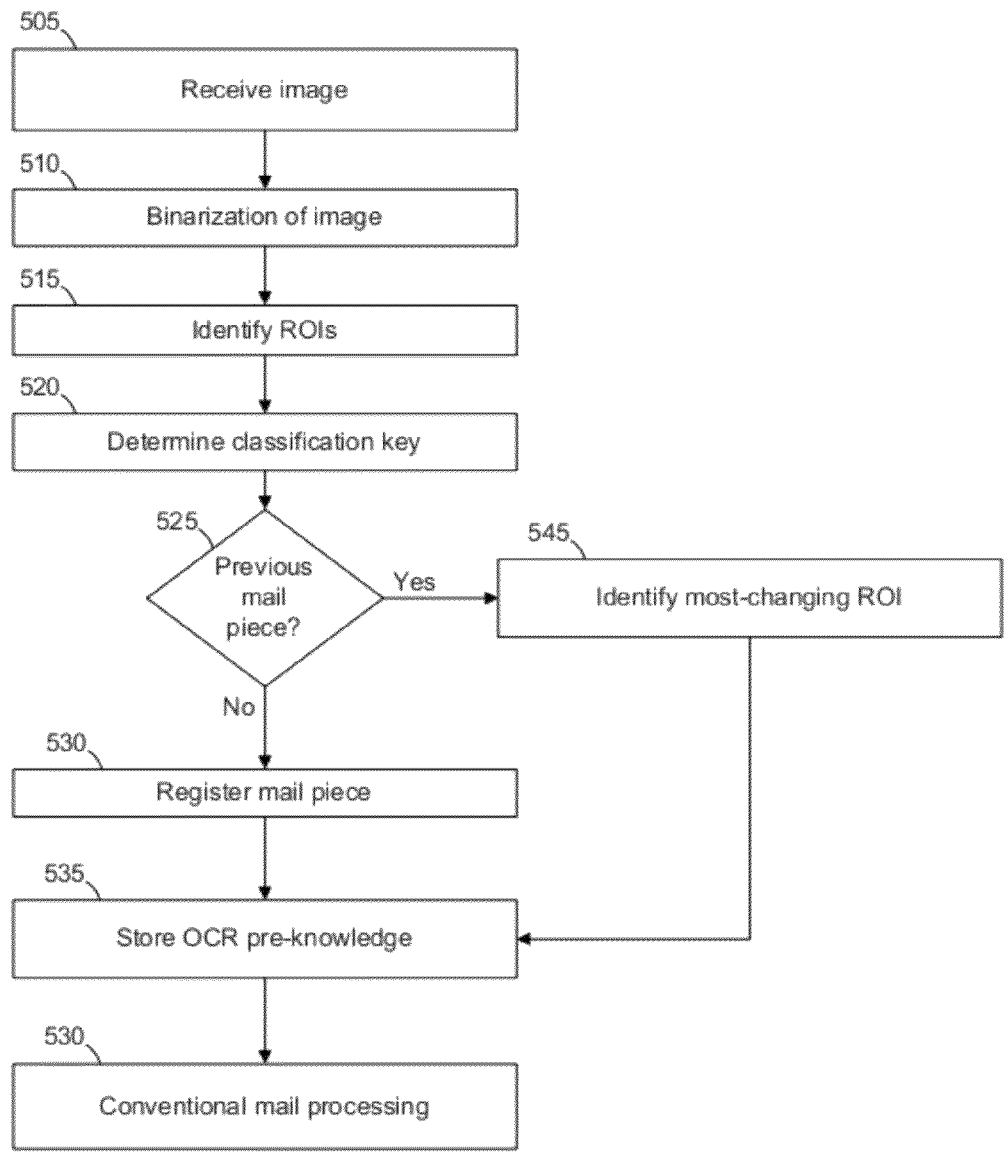
FIG. 5 depicts a flowchart of a process in accordance with disclosed embodiments.

FIG. 5 shows a flowchart of a process in accordance with disclosed embodiments, whereby all mail is tested to determine whether it is bulk mail, and ROI learning takes place for all bulk mail classes. The decision regarding implementation as a part of the standard process or as an exception process is based on which option offers the best value.

The system receives an image of a mail piece (step 505). Receiving can include actually scanning the mail piece with a scanner or other imager, receiving the image from another system, or loading an image from storage.

The system performs a binarization process on the image (step 510), if necessary for an effective overlay analysis as described herein.

The system identifies multiple regions of interest of the image (step 515).

The system determines a classification key for the image based on relationships between the multiple regions of interest of the image (step 520)

If a previous mail piece with a corresponding classification key has not already been processed and registered (step 525), this mail piece image and classification key is registered for future comparisons (step 530). OCR pre-knowledge based on the ROIs can be stored for the mail piece (step 535), and the image and pre-knowledge is used for conventional mail piece processing (step 540), which can include OCR processes, any necessary video coding, and sorting or other processing. This block is used for the conventional mail piece processing, particularly when the pre-knowledge at this stage can identify the most likely recipient address block.

If a previous mail piece with a corresponding classification key has already been processed and registered (at step 525), the system identifies the most-changing ROI (step 545). The identification can include processes as described herein, including loading a stored image of the previous mail piece(s) having a corresponding classification key, performing an overlay process as described above, and identifying from the overlay that particular ROI that has shown the most significant change. In some cases, the identification process can be omitted until a predetermined number of corresponding images have been processed, so that the identification processes are only performed when a bulk mailing batch is being processed and cause the threshold to be passed.

OCR pre-knowledge based on the ROIs and the identified most-changing ROI can be stored for the mail piece (step 535), and the image and pre-knowledge is used for conventional mail piece processing (step 540), which can include OCR processes, any necessary video coding, and sorting or other processing. The most likely recipient address block—the most-changing ROI—is used for the conventional mail piece processing as the recipient address.

In some embodiments, the process of FIG. 5 is executed prior to traditional OCR. The disclosed embodiments screen images to detect bulk classes by "learning" layout types, registering them, counting occurrences of each type, and checking the incremented count against a preset threshold. Images whose type count is less than the threshold are considered not part of a bulk mailing, and the OCR is allowed to process the image without specific ROI "Pre-Knowledge." In this case, the processing step described above is only performed after the preceding steps have been performed on a plurality of mail pieces and classification keys for bulk mailings, based on ROIs of mail of a common type and similar ROI relationships, have been determined. On the other hand, an item whose type count exceeds the threshold is processed as a bulk mailing.

If an item has exceeded the threshold for the type, the system in various embodiments checks to see if the type has "learned" the location of the recipient address. If the recipient address location is not known, as for the first item exceeding the threshold for a type, the system performs the overlay and analysis functions, as illustrated in the example of FIG. 4, and stores the recipient address location for that bulk type. When the recipient address location is known for an images as classified by bulk type, the recipient address location is passed to the OCR as pre-knowledge.

Various embodiments can reset the stored recipient address location information for a type, based on the number of times OCR has failed for a given bulk class, despite the ROI pre-knowledge. Each instance in which the OCR has not successfully read the recipient address, despite pre-knowledge, causes the image to be sent to manual video coding and for the count of read failures according to the pre-knowledge for that bulk class to be incremented. When the count of read failures reaches a predetermined threshold, the stored pre-knowledge for that bulk type is erased.

Although not shown for the sake of clarity in the simplified diagram, other counts according to thresholds can be maintained by the system in various embodiments, such as the number of times pre-knowledge for a given bulk class has been reset. The specified number of pre-knowledge resets could be used, for example, to cause the registration for the bulk class in question to be reset.

One particular advantage of the disclosed embodiments is a leveling in the staffing requirements for video coding by eliminating surges of OCR rejects according to classes of bulk mail with ROI difficulties.

In the processes described herein, various steps can be omitted, added, or performed concurrently, sequentially, or in a different order, unless otherwise specified.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method, comprising:
receiving an image of a mail piece in a mail processing system;
identifying multiple regions of interest of the image by the mail processing system;
determining a classification key for the image based on a plurality of relationships between the multiple regions of interest;
identifying a most-changing region of interest of the multiple regions of interest; and
processing the mail piece using the identified most-changing region of interest as the recipient address block.

2. The method of claim 1, wherein processing the mail piece includes performing an optical character recognition process on the most-changing region of interest.

3. The method of claim 1, wherein processing the mail piece includes sorting the mail piece based on the recipient address.

4. The method of claim 1, wherein identifying the most-changing region of interest includes performing an overlay process between the received image and a stored image that has a corresponding classification key.

5. The method of claim 1, further comprising performing a binarization process on the image.

6. The method of claim 1, wherein if a previous mail piece with a corresponding classification key has not already been processed and registered, then the received mail piece image and classification key is registered for future comparisons.

7. The method of claim 1, wherein the mail processing system stores OCR pre-knowledge and uses the OCR pre-knowledge for processing the mail piece.

8. The method of claim 1, wherein the identifying step is not performed until a predetermined number of corresponding images have been processed.

9. The method of claim 1, wherein the identifying step is only performed when processing a bulk mailing batch.

10. The method of claim 1, wherein processing step is only performed after the preceding steps have been performed on a plurality of mail pieces and classification keys for bulk mailings have been determined.

11. A mail processing system, comprising:
a processor;
accessible memory; and
an imager configured to create an image of a mail piece, wherein the mail processing system is configured to perform the steps of
receiving an image of a mail piece;
identifying multiple regions of interest of the image;
determining a classification key for the image based on a plurality of relationships between the multiple regions of interest;
identifying a most-changing region of interest of the multiple regions of interest; and processing the mail piece using the identified most-changing region of interest as the recipient address block.

12. The mail processing system of claim 11, wherein processing the mail piece includes performing an optical character recognition process on the most-changing region of interest.

13. The mail processing system of claim 11, wherein processing the mail piece includes sorting the mail piece based on the recipient address.

14. The mail processing system of claim 11, wherein identifying the most-changing region of interest includes performing an overlay process between the received images and a stored image that has a corresponding classification key.

15. The mail processing system of claim 11, wherein the mail processing system also performs a binarization process on the image.

16. The mail processing system of claim 11, wherein if a previous mail piece with a corresponding classification key has not already been processed and registered, then the received mail piece image and classification key is registered for future comparisons.

17. The mail processing system of claim 11, wherein the mail processing system stores OCR pre-knowledge and uses the OCR pre-knowledge for processing the mail piece.

18. The mail processing system of claim 11, wherein the identifying step is not performed until a predetermined number of corresponding images have been processed.

19. The mail processing system of claim 11, wherein the identifying step is only performed when processing a bulk mailing batch.

20. The mail processing system of claim 11, wherein processing step is only performed after the preceding steps have been performed on a plurality of mail pieces and classification keys for bulk mailings have been determined.

* * * * *